United States Patent
Baumgartner et al.

(10) Patent No.: US 8,467,097 B2
(45) Date of Patent: Jun. 18, 2013

(54) METHOD AND DEVICE TO SORT PIXEL DATA IN A PRINT DATA STREAM

(75) Inventors: Robert Baumgartner, Wörth (DE); Martin Wilhelm, Maitenbeth (DE)

(73) Assignee: Océ Printing Systems GmbH, Poing (DE)

( * ) Notice: Subject to any disclaimer, the term of this patent is extended or adjusted under 35 U.S.C. 154(b) by 180 days.

(21) Appl. No.: 13/223,511

(22) Filed: Sep. 1, 2011

(65) Prior Publication Data

US 2012/0224196 A1   Sep. 6, 2012

(30) Foreign Application Priority Data

Sep. 3, 2010   (DE) .................. 10 2010 037 303

(51) Int. Cl.
*G06F 7/26*   (2006.01)
(52) U.S. Cl.
USPC .................. 358/1.9; 400/124.07; 358/300
(58) Field of Classification Search
USPC ............................... 358/1.9, 300, 3
See application file for complete search history.

(56) References Cited

U.S. PATENT DOCUMENTS

| | | | | |
|---|---|---|---|---|
| 5,586,055 A | * | 12/1996 | Ng et al. | 702/90 |
| 7,375,738 B2 | * | 5/2008 | Corbett et al. | 347/234 |
| 7,535,474 B1 | * | 5/2009 | Scholander et al. | 345/531 |

FOREIGN PATENT DOCUMENTS

| | | |
|---|---|---|
| DE | 3533163 A1 | 3/1986 |
| DE | 697 30 754 T2 | 7/1998 |
| DE | 698 00 685 T2 | 4/2001 |

OTHER PUBLICATIONS

Digital printing—Technology and printing techniques of Oce digital printing presses 10th edition, Oct. 2006, ISBN 3-00-001081-5, chapter 9 "The SRA Controller" Dr. Dieter Joergens et al.
Virtex-5 FPGA, User Guide, UG 190 (v 5.2) Nov. 5, 2009, Seiten 178 and 181.

* cited by examiner

*Primary Examiner* — Tammy Pham
*Assistant Examiner* — Richa Mishra
(74) *Attorney, Agent, or Firm* — Schiff Hardin LLP

(57) ABSTRACT

In a method and a device to sort pixel data in a print data stream, a data sorting memory is used configured so that it can be written per column and read per row. The pixel data are entered per column into the data sorting memory in the order of the incoming print data stream. Via the per-row readout the pixel data are re-sorted into an order suitable to control the print head. The sorting can thereby take place in only one write process and one read process.

8 Claims, 3 Drawing Sheets

METHOD AND DEVICE TO SORT PIXEL DATA IN A PRINT DATA STREAM

BACKGROUND

The preferred embodiment concerns a method and a device to sort pixel data in a print data stream.

In digital printing the image data are often supplied to the print group in the form of pixel data in a print data stream. Each pixel data contains the information to control one pixel. In black-and-white printing such a pixel data can comprise only a single bit. If the pixel data contains greyscale and/or color information, it can also comprise multiple bits. Pixel data with two bits, four bits or eight bits respectively are typical.

The pixel data in the print data stream are normally supplied to a printing device in the order with which they should be printed next to one another in a print line. For example, if the pixel data in the printing device are generated from a vector representation they are also typically arranged in this order in a print data stream.

However, there are also print groups that cannot process the pixel data in this order. For example, there are print heads for inkjet printing that have inkjet nozzles arranged in multiple rows. Within the rows the inkjet nozzles are respectively identically spaced apart from one another. The inkjet nozzles of the different rows are respectively arranged offset from one another. This offset is designed such that, when all rows of inkjet nozzles print the same line in a print line on a recording material, each nozzle is associated with a different pixel on this line of the recording material. The print line is any line that is printed transverse to the transport direction of the recording material. A line along a print row that has a thickness of one pixel is designated as a print line in the following. In other words, this means that the printing along the print line on a recording material is composed via the printing of all rows of inkjet nozzles of the print head. Since the inkjet nozzles are spaced identically from one another in the individual rows, their spacing is identical to the number of pixels in a line on the recording material, which corresponds to the number of rows. For example, if the print head has 16 rows of inkjet nozzles, within each row the inkjet nozzles are spaced 16 pixels apart from one another.

A Scalable Raster Architecture (SRA) print data controller that, among other things, is controlled by means of Field Programmable Gate Arrays (FPGAs) in which complex logics are integrated is described in "Digital printing—Technology and printing techniques of Océ digital printing presses", 10th edition, October 2006, ISBN 3-00-001081-5, Chapter 9 "The SRA Controller".

The company Xilinx, Inc., USA manufactures different FPGAs. Such FPGAs possess configurable memory ranges that are also designated as Distributed RAMs (see, for example, Virtex-5 FPGA, User Guide, UG190 (v5.2) Nov. 5, 2009, Pages 178 and 181). These memory ranges can be configured with the Xilinx CORE Generator software.

SUMMARY

It is an object to achieve a method and a device for sorting pixel data in a print data stream with which the pixel data can be sorted quickly and with simple means without a correspondingly high computing power having to be provided.

In a method or device for sorting pixel data in a print data stream, wherein each pixel data has small end bits, the pixel data are arranged in an order with which they should be printed in a print line. A print head has pixel generation elements arranged in m rows in the print head and respectively spaced identically apart from one another within the m rows, the spacing corresponding to m pixels in a print line. The pixel generation elements of different rows are respectively offset so that each of the pixel generation elements of all of the rows of the print head is respectively associated with a different pixel in the print lines. The pixel data are stored in a data storing memory. The memory has memory cells arranged in columns and rows at least in a logical two-dimensional array. Each memory cell respectively has n memory units to store a respective pixel data and m memory cells arranged in each column. The pixel data are written into one of the respective memory cells, wherein the pixel data are written into the columns with the same order as in the print data stream. When all memory cells of a column have been completely written to, additional pixel data are written into a column adjacent to the column previously written into. Upon reading the pixel data, the pixel data are read out along the rows of the memory cells.

DESCRIPTION OF THE PREFERRED EMBODIMENTS

Figure 1:
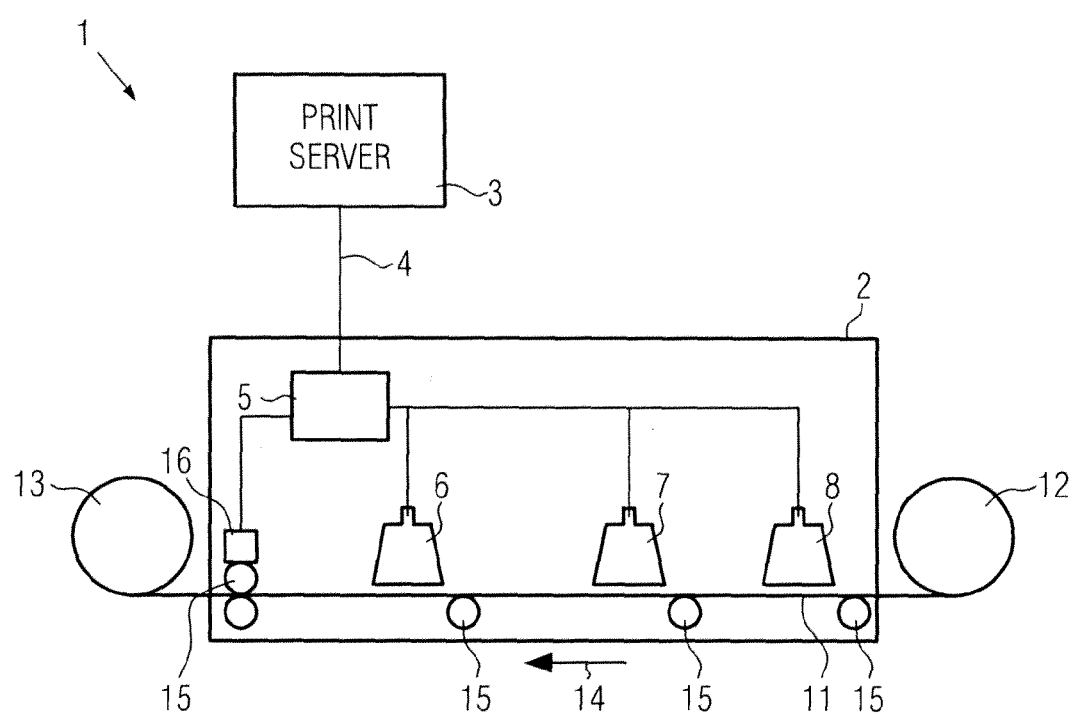
FIG. 1 illustrates schematically a printing system according to the preferred embodiment in a block diagram.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

Pixel data in a print data stream are sorted with the method according to the preferred embodiment. Each pixel data respectively has n bits, and the pixel data in the print data stream are arranged in the order with which they should be printed side by side in a print line. With each pixel data a pixel generation element of a print head is activated, wherein the pixel generation elements are arranged in m rows in the print head and are respectively spaced identically apart from one another within the m rows. This spacing corresponds to m pixels in the print line. The pixel generation elements of different rows of the print head are respectively offset relative to one another so that each of the pixel generation elements of all series of the print head is respectively associated with a different pixel in the print line. The pixel data are stored in a data sorting memory that has memory cells arranged in columns and rows at least in a logical two-dimensional array, wherein each memory cell respectively has n memory units to store a respective pixel data and m memory cells are arranged in each column. The pixel data are written into the columns with the same order as in the print data stream, and when all memory cells of a column have been completely written then the additional pixel data are written into the column adjacent to this, wherein upon reading the pixel data these are read out along the rows of memory cells.

Since the pixel data are written along the columns in the two-dimensional array of memory cells and are read out along the rows of the two-dimensional array, they are re-sorted. The sorting process merely takes place via a one-time writing of the pixel data in the data sorting memory and a one-time readout of the respective pixel data. No additional exchange and sorting operations are required as they occur given conventional sorting algorithms that are executed by means of a software solution. The (m+1)-th pixel data are respectively successively arranged in the rows of the two-dimensional array in the sorted order of the pixel data, such that the pixel data are sorted in the order with which they are to be printed with the respective rows of pixel generation elements.

A sorting memory is advantageously used in which the number of the memory cells in a respective row corresponds to the number of pixel generation elements in a respective row at the print head.

To execute the method according to the preferred embodiment, only a two-dimensional array of memory cells is required that can be written to along the columns and read along the rows. Such an array of memory cells can be configured in a memory range of an FPGA, for example. The use of such an FPGA is significantly more advantageous than the use of an additional microprocessor with high computing power that would be necessary given a software solution for sorting the pixel data.

The device according to the preferred embodiment is designed to sort pixel data in a print data stream. Each pixel data respectively has n bits. The pixel data are arranged in the order in the print data stream with which they should be arranged next to one another in a print line. The device has a print head with pixel generation elements that are arranged in m rows in the print head, wherein the pixel generation elements within the m rows are respectively spaced identically from one another and this spacing corresponds to m pixels in the print line. The pixel generation elements of different rows are respectively offset from one another so that each of the pixel generation elements of all rows of the print head is respectively associated with a different pixel in the print line. The device has a data sorting memory that has memory cells arranged in columns and rows, at least in a logical two-dimensional array, wherein m memory cells are arranged in each column m. Every memory cell respectively has n memory units to store one pixel data respectively. A control circuit is provided that is designed and connected with the memory cells such that the pixel data are written into the columns with the same order as in the print data stream; when all memory cells of a column are completely written, the additional pixel data are written into the column(s) adjacent to this, wherein upon reading the pixel data are read out along the row of memory cells.

The data sorting memory of this device is designed so that they are sorted along the rows of the array solely via the writing of the pixel data in the columns of the two-dimensional array of memory cells and reading of the same. The pixel data sorted in such a manner can be supplied in this order to the print head for activation of the pixel generation elements.

The print head is advantageously an inkjet print head. The pixel generation elements are then inkjet nozzles. However, different print heads of digital printing can also be used within the scope of the preferred embodiment.

The memory cells are advantageously designed as volatile memory with two connectors, i.e. as dual-ported Random Access Memories (RAMs) with two respective sets of address and data lines, wherein one set of address and data lines is connected with a write logic to write the pixel data and are designated as write address and data lines, and the other set of address line and data line is connected with a read logic to read the pixel data and are designated as read address line and data line. Via the use of dual-ported RAMs it is possible to decouple the writing and reading of the pixel data into and from the memory cells from one another. The write logic to write the memory cells can hereby simply be realized in the column direction, and the read logic to read the memory cells are simply realized in the row direction.

The read address lines are advantageously designed such that a defined row in the array is selected by a defined read address and all memory cells of this row are read upon reading.

Within the columns, the write signals of all memory cells are advantageously wired in parallel and can be selected by the write logic such that upon writing all memory cells of a column are written via the application of a write signal.

The array of memory cells can be designed from multiple memory blocks with i memory units respectively. n memory blocks with their address inputs are respectively connected in parallel and the respective n memory blocks connected in parallel are designated as a memory module. The memory units that are arranged at the same point in the memory blocks of each memory module form the memory cells. Multiple overlapping arrays of memory cells form a logical cuboid, wherein the memory modules extend transverse to the plane of the arrays so that each memory module is arranged with a memory cell in each of the arrays.

What is expressed by the terms "logical arrays" and "logical cuboid" is that the individual memory blocks or memory modules do not need to be arranged in a spatial arrangement in order to design a two-dimensional array or a cuboid; rather, they are interconnected with one another along the columns such that they write per column and are along the rows such that they can be read per row. Given the presence of a third dimension (cuboid), multiple such two-dimensional arrays of memory cells are present.

The write address lines are advantageously designed such that a specific one of multiple arrays is selected by a specific address, and upon writing all memory cells of a column of this array are written to.

The read address lines are advantageously designed to address all memory cells in the same rows in all arrays, wherein the read data lines are connected with an input of a multiplexer in order to select the read data lines of a single array upon reading and to connect them to an output.

The data sorting memory of the device according to the preferred embodiment is advantageously a configurable data sorting memory, for example a data sorting memory configurable in an FPGA. The control circuit with the write logic and read logic is advantageously also formed in the FPGA comprising the data sorting memory.

It is also possible to form the data sorting memory and the control circuit from one or more Application Specific Integrated Circuits (ASICs).

The device can have a cache downstream from the data sorting memory, which cache possesses a multiple of the memory capacity of the data sorting memory in order to cache the sorted pixel data before they are relayed to a print head for execution of the printing process.

Figure 2:
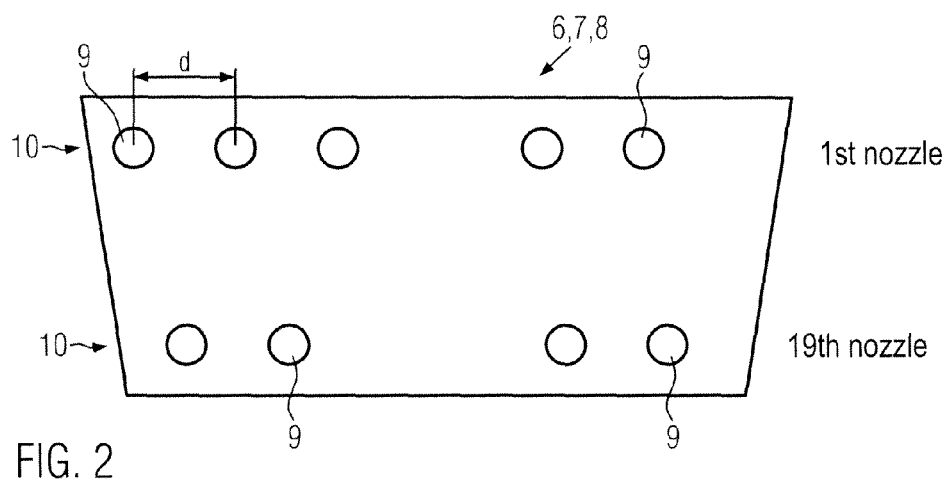
FIG. 2 shows schematically an inkjet print head with viewing direction towards the inkjet nozzles, wherein only a few inkjet nozzles are shown to simplify the presentation.

FIG. 1 shows a printing system 1 designed according to the preferred embodiment. This printing system 1 comprises a printing apparatus 2, and a print server 3 to which the printing apparatus 2 is connected by means of a data line 4. In the printing apparatus 2 the data line 4 ends at a Scalable Raster Architecture (SRA) print data controller 5. The print data controller 5 processes the print data stream arriving from the print server, wherein this processing can comprise different processing steps. The print data stream contains pixel data that are sorted in the print data controller 5. These print data are also rastered as needed. This depends on whether the print data are directly suitable to activate the print heads 6, 7, 8 connected with the print data controller 5, or whether they need to be rastered in corresponding halftones. In the present exemplary embodiment the print heads 6 through 8 are respectively inkjet print heads, respectively with a plurality of pixel generation elements in the form of inkjet nozzles 9. These inkjet nozzles are arranged in multiple rows 10 at the respective print heads 6, 7, 8 (FIG. 2). Since the inkjet nozzles 9 are identically spaced apart from one another in the individual rows, their spacing d is identical to the number of pixels in a line on the recording material that corresponds to the number of rows. For example, if the print head has 16 rows of inkjet nozzles, within each row the inkjet nozzles are spaced apart from one another by 16 pixels. Ink of a different color is applied to a recording material 11 with each print head 6, 7, 8.

The recording material 11 is a paper web that is unrolled from an input roll 12 and is rolled up on an output roll 13.

The web-shaped recording material 11 is moved in the transport direction 14 along a transport path. The transport path is defined by rolls 15 that are arranged above and below the transport path. One of the rolls 15 is provided with a decoder 16 to scan the path movement of the recording material. The decoder 16 is connected with the print data controller 5 and supplies the current position of the recording material 11 to the print data controller 5. Using this signal the print data controller 5 can activate the individual rows 10 of inkjet nozzles 9 such that they generate the desired print image on the recording material.

The inkjet nozzles 9 in the individual rows 10 are offset a little bit from one another transverse to the transport direction 14 of the recording material 11, such that each nozzle 10 of one of the print jobs 6, 7, 8 is associated with a different pixel on the recording material 11 in a line transverse to the transport direction 14. A print line is hereby printed in multiple steps, wherein in each step a respective row 10 of the inkjet nozzles 9 prints a specific portion of the pixels of the print line. In practice the inkjet nozzles 9 of all series 10 are activated simultaneously so that each print head prints multiple respective parts of different print lines on the recording material 11 during a "shot".

The print data delivered from the print server 3 to the print data controller 5 contain the pixel data in the order with which they should be printed next to one another in a print line.

However, since a print line cannot be printed all at once with one shot—rather the pixels belonging to one print line are printed with different rows 10 of inkjet nozzles 9—it is necessary to filter pixel data belonging to each row 10 out of the print data stream and sort it.

Figure 3:
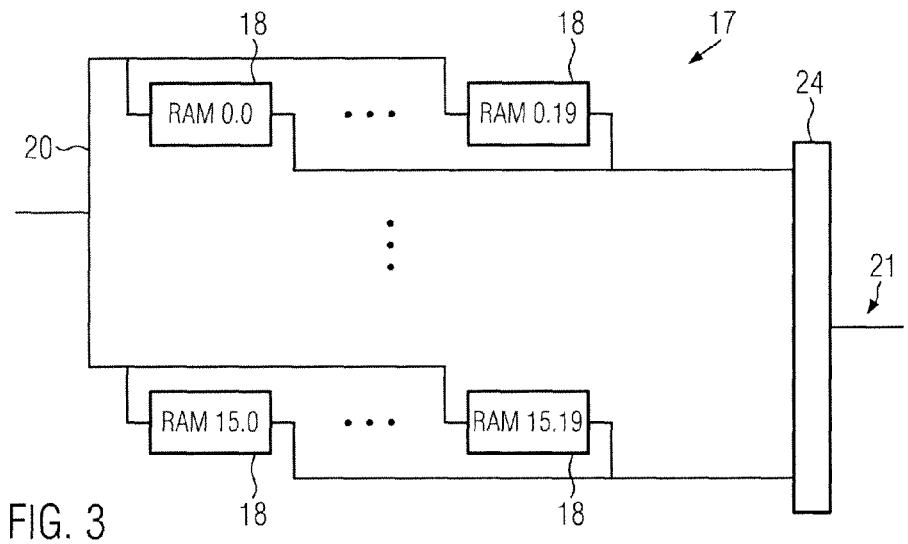
FIG. 3 illustrates schematically a data sorting memory with multiple memory blocks in a block diagram.

The data sorting memory schematically presented in FIG. 3 is provided for this. The data sorting memory 17 comprises multiple memory blocks with i memory units respectively. One bit can be stored in each memory unit. In the present exemplary embodiment the memory blocks have 16 memory units (i=16) respectively.

n memory blocks with their address inputs are respectively wired in parallel, and the n memory blocks respectively form a memory module 18 (RAM 0.0-RAM 15.19). In the present exemplary embodiment, four memory blocks are respectively interconnected into a memory module. The memory units of each memory module 18 that are arranged at the same points in the memory blocks form a memory cell 19. Since four memory blocks are combined into a memory module 19 in the present exemplary embodiment, each memory cell 19 has four memory units to store four bits. A pixel data with 4 bits can thus be stored in each memory cell 19. 20 respective memory modules 18 are wired in parallel between an input 20 and an output 21. These 20 memory modules 18 wired in parallel respectively form one row.

16 such rows are arranged in parallel to one another between the input 20 and the output 21. The first and second through 20-th memory module of the respective rows 22 form respective columns 23. An array of 16 rows and 20 columns is thus formed by this circuit of memory modules. A multiplexer 24 is provided before the output 21.

The memory blocks are respectively dual-ported RAMs, meaning that they respectively have two sets of data and address lines. One set of these data and address lines is used to write the data and is therefore designated as a write data line and an address line. The other set of address line and data line is used to read the content of the memory blocks and therefore is designated as a read data line and address line. The write data and address lines lead to the input 20, up to the respective memory blocks or memory modules 18, and the read data and address lines lead from the memory blocks or memory modules 18 to the multiplexer 24.

All memory blocks possess a signal connection to receive a write signal. These signal connections connect all memory blocks of a column 23 with one another so that all memory blocks or memory modules 18 can be set into the write state (in which data can be written to the memory blocks) with only a single control signal for writing. Via application of the corresponding write signals a specific column can respectively be selected to write data.

The write address lines are designed such that a specific memory address—a specific memory cell 19 in all memory modules 18—is activated for writing.

Figure 4:
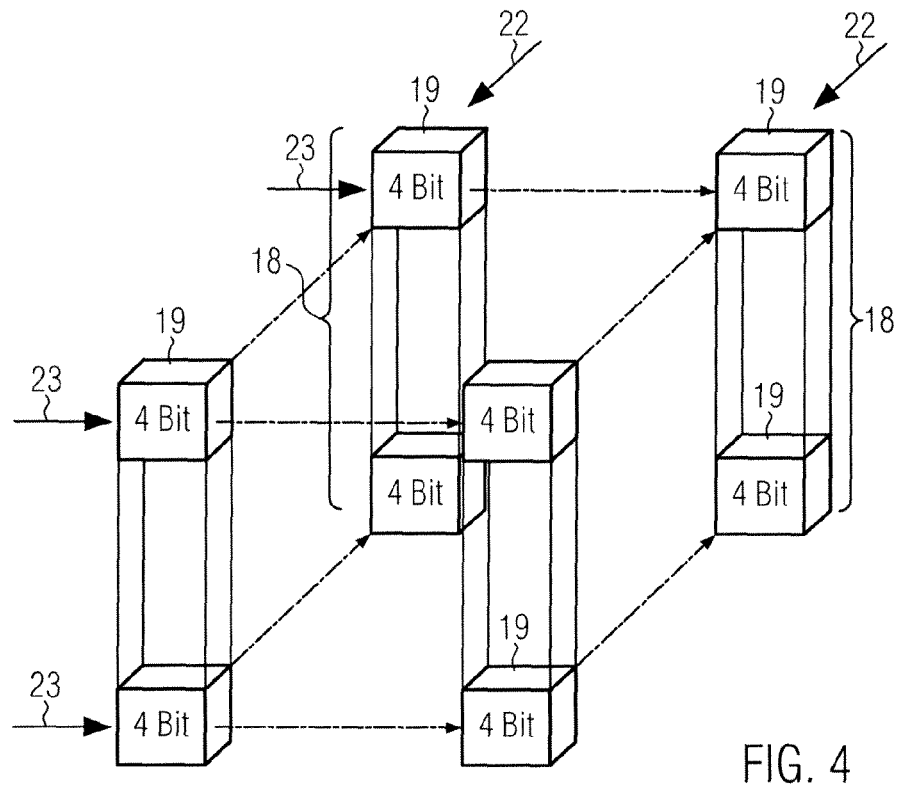
FIG. 4 illustrates the logical arrangement of memory cells of the data sorting memory from FIG. 3.

All memory cells 19 of the data store shown in FIG. 3 form a logical cuboid (FIG. 4), wherein the memory modules 18 arranged parallel to one another extend in the Z-direction and are arranged with the 0-th memory cell at the lowermost level and the 15-th memory cell in the uppermost level. The columns 23 extend in the X-direction and the rows 22 extend in the Y-direction. Each level thus forms a two-dimensional cuboid array of memory cells 19.

A level or a two-dimensional array of memory cells 19 can respectively be addressed with a write address from 0 to 15 at the write address lines. In combination with a write signal a column can thus be specifically activated in an individual level or an individual array. It is thus possible to write a specific column in a specific array. Since a column in each array 16 comprises memory cells 19 and each memory cell has 4 bits, 64 bits can be written to a column in one write process 64.

In contrast to this, the same rows are activated in all arrays with the read address lines. If a read address j of 0 to 19 is thus applied at the address line, the content of the memory cells 10 in the j-th row in all arrays is applied to the corresponding read data lines. Of these 16 sets of 20×4 read data lines, one set of an individual two-dimensional array is applied at the output 21 by means of the multiplexer 24. The eightieth bit of a row 22 of an array is thus present at the output 21.

With the data sorting memory 17 it is thus possible to write the data into the arrays of memory cells 19 along columns and read them out along rows 23.

Figure 5:
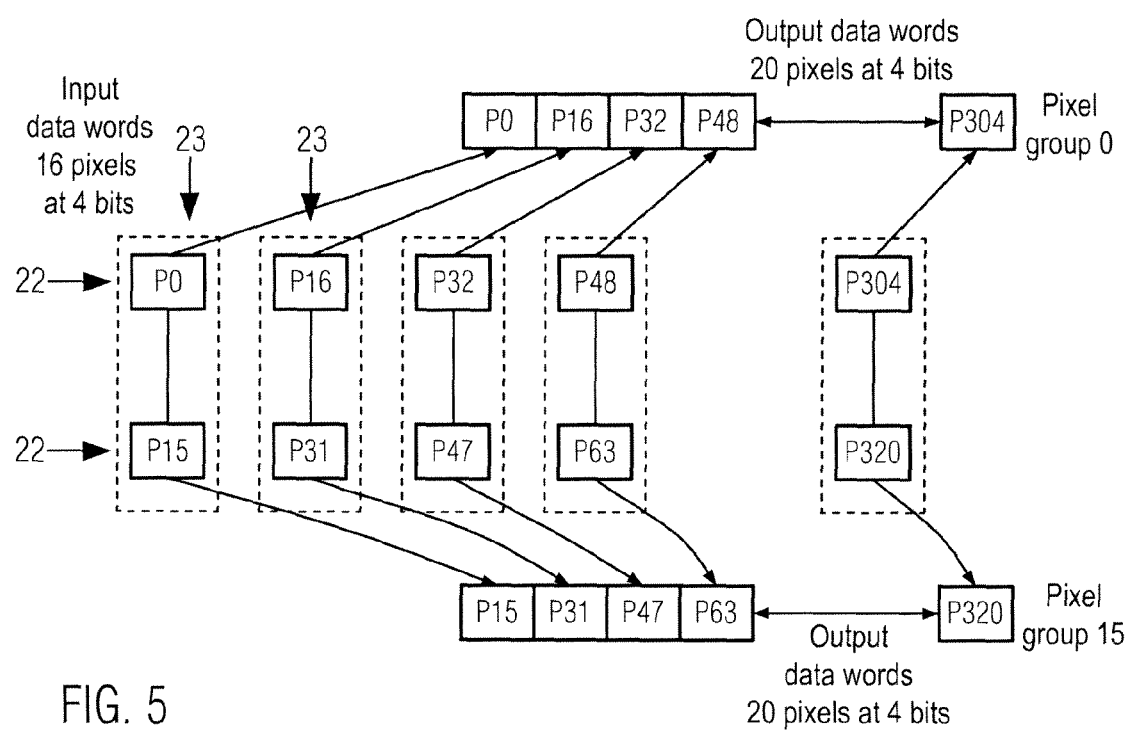
FIG. 5 illustrates schematically a sorting process for pixel data.

This has the result that the pixel data (wherein a respective pixel data comprises four bits) are written into the columns 23 in the order contained in the incoming developer station (for example P0 to P15 in FIG. 5), wherein a respective pixel data P is entered into each memory cell 19.

In the rows the k-th pixel data, k+16-th pixel data, k+32-th pixel data through k+304-th pixel data (P0 through P304 in row 0 in FIG. 5) are thus present in the rows, wherein k is the number of the row from 0 to 15 in an array. The pixels spaced apart from one another by the number of rows in the original print data stream are thus respectively arranged next to one another in the rows. The individual rows thus contain precisely the pixel data that should be supplied to a row of inkjet nozzles of one of the print heads. Thus only a specific row of the data sorting memory 17 must be read out to activate a specific one of the rows 10 of inkjet nozzles 9. Since the individual rows can be activated exactly by means of the read address lines and the multiplexer 24, any arbitrary row can be read out from the data sorting memory 17.

The pixel data are thus sorted correctly solely via the per-column writing of the pixel data in the memory cells 19 and the per-row reading of the pixel data from the memory cells 19, and are correctly combined to activate the series of inkjet nozzles.

In the present exemplary embodiment the data sorting memory 17 comprises sixteen rows and twenty columns. In another embodiment of the print head it can naturally be appropriate to provide a different number of columns and rows. In the present exemplary embodiment a pixel data comprises four bits. However, other print heads are also known in which a pixel data comprises only one bit or two bits or even eight bits. The memory cells 19 are to be designed accordingly.

A cache memory can also advantageously be downstream of the data sorting memory 17, which cache memory has a larger memory capacity than the data sorting memory 17. The correspondingly sorted pixel data can be stored and cached in the cache memory until they are required to activate the corresponding print head or the row of inkjet nozzles in the print head.

The present exemplary embodiment was realized with an FPGA that is available under the commercial designation Virtex5 XC5VLX50T-FF1136#. This FPGA has what are known as distributed RAMs that are freely configurable by means of the Xilinx CORE Generator software, wherein the individual memory blocks are configurable both as single-ported-RAM and as dual-ported-RAM and can be initialized in great variety with regard to the address line and the data line.

If the rows of inkjet nozzles at the print head are designed with a different number of inkjet nozzles or with a different number of rows of inkjet nozzles, the number of memory cells in the columns and in the rows of the data sorting memory is to be adapted accordingly.

Although a preferred exemplary embodiment is shown and described in detail in the drawings and in the preceding specification, it should be viewed as purely exemplary and not as limiting the invention. It is noted that only a preferred exemplary embodiment is shown and described, and all variations and modification that presently or in the future lie within the protective scope of the invention should be protected.

We claim as our invention:

1. A method for sorting pixel data in a print data stream, wherein each pixel data respectively has n bits, the pixel data in the print data stream are arranged in an order with which they should be printed side by side in a print line, a print head having pixel generation elements that are arranged in m rows in the print head and are respectively spaced identically apart from one another within the m rows, said spacing corresponding to m pixels in a print line to be printed on a recording material, and the pixel generation elements of different rows being respectively offset relative to one another so that each of the pixel generation elements of all of the rows of the print head is respectively associated with a different pixel in the print line, comprising the steps of:
   storing the pixel data in a data sorting memory that has memory cells arranged in columns and rows at least in a logical two-dimensional array, wherein each memory cell respectively has n memory units to store a respective pixel data and m memory cells are arranged in each column;
   writing the pixel data into one of the respective memory cells, wherein the pixel data are written into the columns with the same order as in the print data stream; and
   when all memory cells of a column have been completely written to, writing additional pixel data into a column adjacent to said column previously written into, wherein upon reading the pixel data said pixel data are read out along the rows of the memory cells.

2. A device to sort pixel data in a print data stream, the pixel data respectively having n bits, each data unit being provided to control a pixel in a digital print head, the pixel data being arranged in the print data stream in an order with which they should be printed on a recording material next to one another in a print line, the print head having pixel generation elements that are arranged in m rows in the print head, the pixel generation elements within the m rows being respectively spaced identically from one another and said spacing corresponding to m pixels in the print line, the pixel generation elements of different rows being respectively offset from one another so that each of the pixel generation elements of all rows of the print head is respectively associated with a different pixel in the print line, comprising:
   a data sorting memory that has memory cells arranged in columns and rows at least in a logical two-dimensional array, wherein every memory cell respectively has n memory units to store a respective data unit;
   a control circuit that is designed and connected with the memory cells such that the pixel data are written into the columns with the same order as in the print data stream; and
   when all memory cells of a column are completely written, additional pixel data are written into a column adjacent to said column previously written into, wherein upon reading the pixel data are read out along the rows of the memory cells.

3. The device according to claim 2, wherein each memory cell is formed from a dual-ported RAM with two sets of address and data lines, wherein one set of address and data lines is connected with a write logic to write the data and are designated as write address lines and data lines, and the other set of address lines and data lines is connected with a read logic to read the data and are designated as read address lines and data lines.

4. The device according to claim 3, wherein the read address lines are designed such that a defined row in the array is selected by a defined read address, and all memory cells of said row are read upon reading.

5. The device according to claim 2 wherein within the columns write signals of all memory cells are wired in parallel and can be activated together by a write logic such that upon writing, all memory cells of a column are written via application of a write signal.

6. The device according to claim 2 wherein the array of memory cells is formed from multiple memory blocks with i memory units respectively, wherein n memory blocks with their address inputs are respectively wired in parallel and the respective n memory blocks wired in parallel are designated as a memory module; the memory units at a same point in the memory blocks of each memory module form one of the memory cells; and multiple overlapping arrays of memory cells form a logical cuboid, wherein the memory modules extend transverse to planes of the arrays so that each memory module is arranged with a memory cell in one of the arrays.

7. The device according to claim 6 wherein the write address lines are designed such that a specific address of a specific array is selected, and upon writing all memory cells of a column of said array are written to.

8. The device according to claim 6 wherein the read address lines are designed to address all memory cells in a same row in all arrays, wherein the read data lines are connected with an input of a multiplexer in order to select the data lines of a single array upon reading.

\* \* \* \* \*